Nov. 2, 1926.
P. McCARTY
INVALID'S CARRIAGE
Filed June 5, 1926
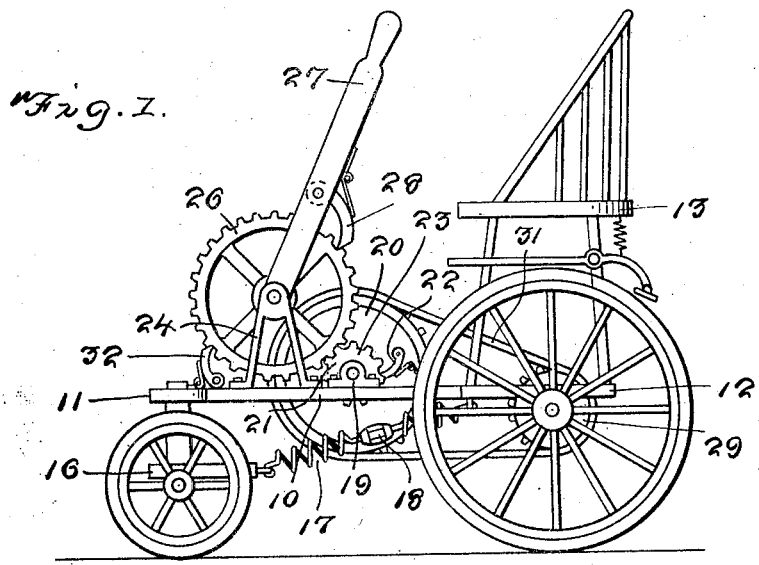
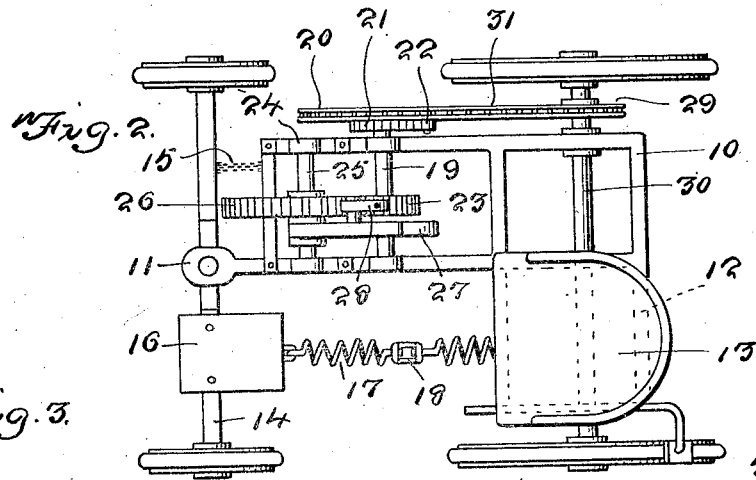
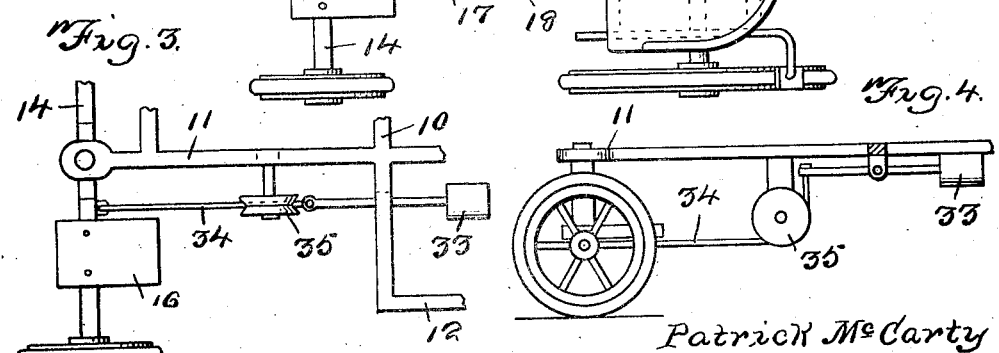
Patrick McCarty
INVENTOR
BY Victor J. Evans
ATTORNEY
WITNESS:
E. R. Ruppart Patented Nov. 2, 1926.

1,605,750

UNITED STATES PATENT OFFICE.

PATRICK McCARTY, OF HONESDALE, PENNSYLVANIA.

INVALID'S CARRIAGE.

Application filed June 5, 1926. Serial No. 113,996.

This invention relates to normally propelled vehicles comprehending the use of a positive operation mechanism so constructed that by a minimum amount of applied actuating power, through the medium of an upwardly projection and oscillating hand engaging device, a forceful driving power will be imparted to the rear axle without lost motion.

Another object of the invention embodies a steering apparatus, normally tensioned to swing and turn in one direction, and controlled by the leg of an operator deprived of its natural freedom of locomotion.

With the above and other objects in view, the invention further includes the following novel features and details of construction, to hereinafter be more fully described, illustrated in the accompanying drawings, and pointed out in the appended claim.

In the drawings:

Figure 1 is a side elevation of the invention.

Figure 2 is a top plan view thereof.

Figure 3 is a fragmentary top plan view of the invention and modified form of tensioning means for the steering apparatus.

Figure 4 is a fragmentary side elevation of the modification.

Referring to the drawing in detail, wherein like characters of reference denote corresponding parts reference character 10 indicates a vehicle frame or chassis forming a tongue 11 upon one end thereof. Said chassis, in addition, contemplates an extension 12 upon one side upon which may be supported a chair or like reposing element 13. The steering or front axle 14 is pivotally mounted for rocking movement at an intermediate point in its length upon the tongue 11. A chain 15 is connected with the forward end of the chassis and steering axle 14 off center thereof to restrict lateral movement of the axle in one direction.

A foot rest, or platform, 16 is carried by the axle 14 and has connected therewith a retractile spring 17 providing a turn buckle 18 at an appropriate point in its length and having its opposite end connected with the extension 12 of the chassis in order that swinging movement of the axle may be regulated as to tension in one direction.

It will be noted that the invention is primarily adapted for use by cripples deprived of the use or total loss of limbs wherein it is necessary to provide a steering apparatus controlled by one foot. The construction by the device may be altered and reversed to accommodate all persons deprived of their natural freedom of locomotion.

Journaled upon the chassis is a driven shaft 19 mounting a relatively large sprocket wheel 20 upon one end. A ratchet 21 is also carried by the shaft 19 and operatively connected with the sprocket gear through the instrumentality of a pawl 22 carried thereby. A spur gear 23 is fixed at an appropriate point in the length of the driven shaft 19.

Bracket arms 24 carried by the chassis receive the extremities of a shaft 25 which has journaled thereon a relatively large propulsion gear 26.

An oscillating operating lever 27 is also journaled upon the shaft 25 and which carries thereon a pawl 28 tensioned for active engagement with the teeth of the propulsion gear; the latter being meshed with the gear 23.

The sprocket gear 20 is operatively connected with the gear 29 fixed upon the adjacent one end of a rear axle 30 through the instrumentality of a sprocket chain 31. An additional pawl 32 is mounted upon the chassis 10 and adapted for engagement with the teeth of the propulsion gear 26 to prevent retrograde movement.

In the use and operation of the present invention it is clear that upon the successive oscillations of the lever 27 operatively connected with the propulsion gear 26, will rotate the latter in a clockwise direction of travel. Said gear owing to its meshed relation with the gear 23 obviously rotates the latter upon the shaft 19 in the counter-clockwise movement with the sprocket gear 20 therefore imparting like movement to the wheels fixed upon the extremities of the rear axle 30.

As stated in the foregoing, the steering axle 14 is tensioned in one direction, that is, toward the leg or limb of an operator in order that his foot may rest upon and engage the plate or platform 16 to release or thrust said axle to guide the vehicle while in transit.

In Figures 3 and 4 of the drawing, I have illustrated a modified form of the invention comprehending the use of a transversely disposed pendulum 33 having one end of a cable 34 connected therewith from the steering axle and trained over a guide pulley wheel 35. Said pendulum serving and operating in a like manner to that of the spring 17.

The invention is susceptible of various changes in its form, proportions and minor details of construction, and the right is herein reserved to make such changes as properly fall within a scope of the appended claim.

Having thus described my invention what is claimed is:

In a vehicle comprising a chassis, propulsion driving and driven shafts carried thereby, a propulsion gear carried by the first mentioned shaft, an operating lever carrying a pawl for operative engagement with a propulsion gear, a spur gear fixed to the driving shaft for meshing engagement with the propulsion gear, a sprocket gear journaled upon one end of the driving shaft, a pawl and ratchet connection between said gear shaft, a sprocket gear carried by the driven shaft, and a chain operatively associating said sprocket gears.

In testimony whereof I affix my signature.

PATRICK McCARTY.